United States Patent
Nishikawa et al.

(10) Patent No.: US 6,252,323 B1
(45) Date of Patent: Jun. 26, 2001

(54) REVOLVING MAGNETIC FIELD TYPE MOTOR

(75) Inventors: Yoshihito Nishikawa, Toyohashi; Mikitsugu Suzuki, Kosai; Takanori Ozawa, Anjo; Mitsuhiko Matsushita, Shizuoka-ken, all of (JP)

(73) Assignee: Asmo Co., Ltd., Shizuoka-Ken (JP)

( * ) Notice: Subject to any disclaimer, the term of this patent is extended or adjusted under 35 U.S.C. 154(b) by 0 days.

(21) Appl. No.: 09/538,033

(22) Filed: Mar. 29, 2000

(30) Foreign Application Priority Data

| Apr. 1, 1999 | (JP) | 11-094782 |
| Oct. 19, 1999 | (JP) | 11-296651 |
| Feb. 20, 2000 | (JP) | 12-054707 |

(51) Int. Cl.$^7$ ............................. H02K 21/00; H02K 1/27
(52) U.S. Cl. ................... 310/156; 310/112; 310/261
(58) Field of Search .................. 310/156, 114, 310/112, 49 R, 261, 216

(56) References Cited

U.S. PATENT DOCUMENTS

| 4,642,502 | * | 2/1987 | Carpenter et al. | 310/156 |
| 4,713,569 | * | 12/1987 | Schwartz | 310/152 |
| 4,739,201 | * | 4/1988 | Brigham et al. | 310/49 R |
| 5,010,266 | * | 4/1991 | Uchida | 310/156 |
| 5,397,951 | * | 3/1995 | Uchida et al. | 310/156 |
| 5,731,647 | * | 3/1998 | Schueller et al. | 310/114 |

FOREIGN PATENT DOCUMENTS

| 2-114848 | * | 4/1990 | (JP) | H02K/37/14 |
| 08251847 | | 9/1996 | (JP) | H02K/1/27 |

* cited by examiner

Primary Examiner—Burton Mullins
(74) Attorney, Agent, or Firm—Sawyer Law Group LLP

(57) ABSTRACT

A revolving magnetic field type motor has a rotor and a stator. The rotor has a plurality of permanent magnets. The permanent magnets defines a plurality of rotor magnetic poles. The number of the rotor magnetic poles is "P". The rotor has a plurality of blocks aligned in the rotor's axial direction. The number of the blocks is "m". Each block has a set of the rotor permanent magnets. One set of the permanent magnets is offset relative to an adjacent set of the permanent magnets by a predetermined offset angle in the rotor's rotational direction. The stator has a plurality of coils, the coils defining a plurality of stator magnetic poles around the axis of the stator, the number of the stator magnetic poles being "T". The predetermined offset angle is selected from within a range from about zero degrees/((m−1)×n) to about 22.5 degrees/((m−1)×n). The number of the rotor magnetic poles "P" is 8n (n is an integer equal to or greater than one). The number of the stator magnetic poles "T" is 9n (n is an integer equal to or greater than one). This motor reliably decreases cogging torque.

19 Claims, 10 Drawing Sheets number of magnet poles P × number of magnet portions K per manget

REVOLVING MAGNETIC FIELD TYPE MOTOR

BACKGROUND OF THE INVENTION

The present invention relates to revolving magnetic field type motors.

Japanese Unexamined Patent Publication No. 8-251847 describes a typical revolving field type motor. The motor includes an eight-pole rotor that has a pair of magnet sets each including eight permanent magnets. The motor also includes a stator that has twelve salient poles. A coil is wound around each salient pole. Specifically, the eight permanent magnets of each magnet set are aligned substantially along a circle about the rotational axis of the rotor. The circles defined by the magnet sets are adjacent to each other along the rotor's rotational axis. One magnet set is located offset relative to the other by a predetermined offset angle (7.5 degrees) with respect to the rotational axis of the rotor. This structure reduces cogging torque generated by the motor.

While the rotor of this motor has eight magnetic poles, the stator of the motor has twelve salient poles. The least common multiple between the number of the rotor magnetic poles and the number of the stator salient poles, which is the least common multiple between eight and twelve, is twenty four. If nine salient poles are provided in the motor, instead of twelve, the corresponding least common multiple is seventy two. The least common multiple between the number of the rotor magnetic poles and the number of the stator salient poles corresponds to cogging torque pulsation, or cogging torque frequency. The cogging torque frequency is inversely proportional to cogging torque. That is, if cogging torque frequency increases as the least common multiple increases, cogging torque decreases.

However, if nine salient poles are provided in the motor, the offset angle between the two magnet sets with respect to the rotor's rotational axis must be altered to optimally decrease the cogging torque.

Cogging torque should be reduced in motors other than those having nine salient poles, or motors in which the number of the rotor magnetic poles (P) and the number of the stator salient poles (T) satisfy the following equation:

P=8n and T=9n (n is an integer equal to or greater than one).

SUMMARY OF THE INVENTION

It is an objective of the present invention to provide a revolving magnetic field type motor that reliably decreases cogging torque.

To achieve the above objective, a revolving magnetic field type motor is provided. The motor includes a rotor having a plurality of sets of permanent magnets. The permanent magnets defines a plurality of rotor magnetic poles. The number of the rotor magnetic poles is "P". The rotor has a plurality of blocks aligned in the rotor's axial direction. The number of the blocks is "m". Each block has a set of the rotor permanent magnets. One set of the permanent magnets is offset relative to an adjacent set of the permanent magnets by a predetermined offset angle in the rotor's rotational direction. A stator has a plurality of coils. The coils defines a plurality of stator magnetic poles around an axis of the stator. The number of the stator magnetic poles is "T". The coils generates a magnetic field for rotating the rotor when supplied with an electric current. The predetermined offset angle is within a range from about zero degrees/((m−1)×n) to about 22.5 degrees/((m−1)×n). The number of the rotor magnetic poles "P" is 8n (n is an integer equal to or greater than one). The number of the stator magnetic poles "T" is 9n (n is an integer equal to or greater than one). The number of the blocks "m" is an integer equal to or greater than two.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiment together with the accompanying drawings in which:

DETAILED DESCRIPTION OF THE PREFERRED EMBODIMENTS

A revolving magnetic field type motor of a first embodiment according to the present invention will now be described with reference to FIGS. 1 to 7.

Figure 1:
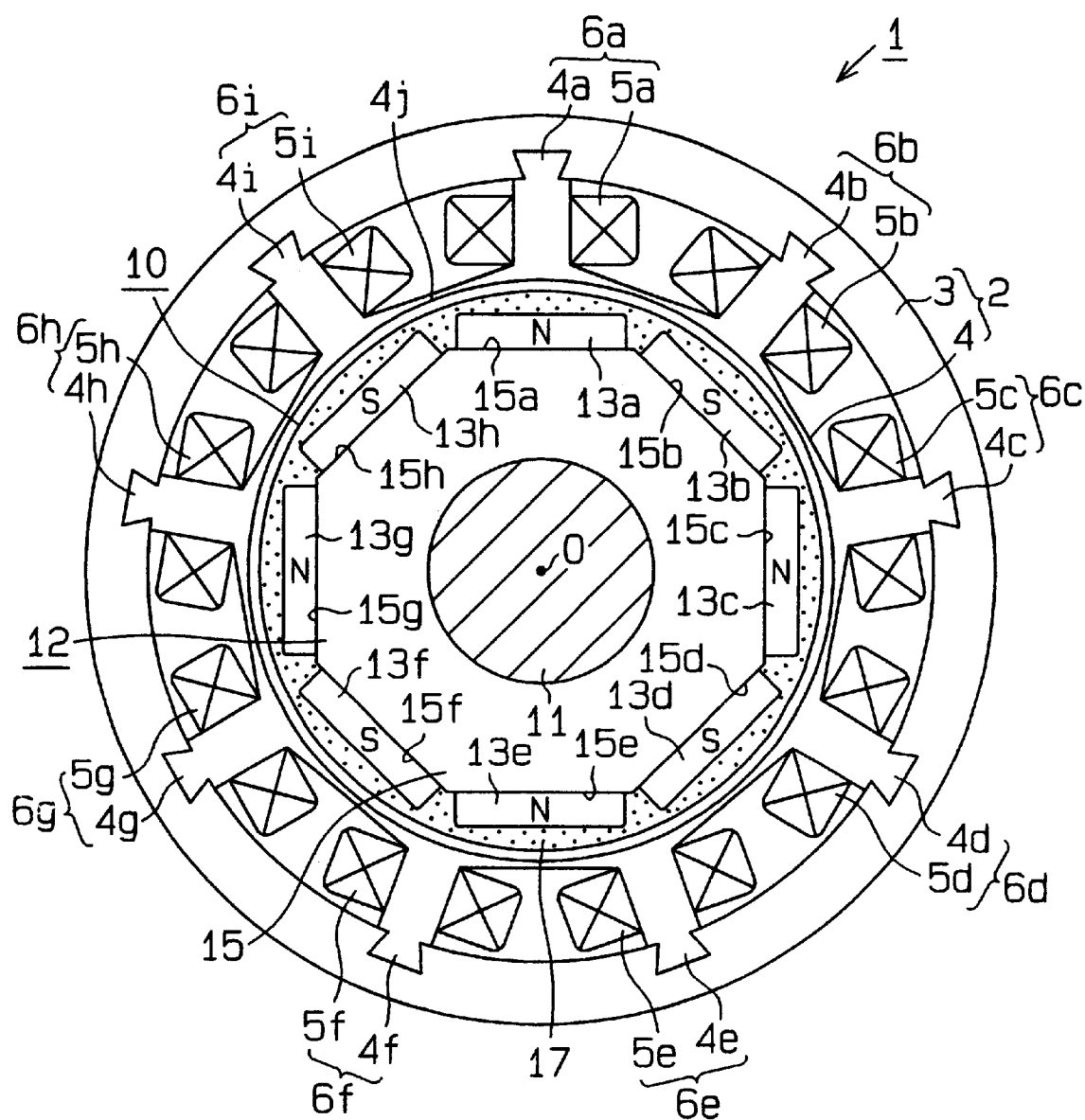
FIG. 1 is a schematic view showing a revolving magnetic field type motor of a first embodiment according to the present invention.

As shown in FIG. 1, a revolving magnetic field type motor 1 has a stator 2 that includes an annular outer core 3 and an annular inner core 4. Each core 3, 4 is formed by a plurality of steel rings disposed along the axis of the stator 2 and connected with one another. Nine teeth 4a–4i radially project from the inner core 4. Adjacent teeth 4a–4i are spaced from each other by a uniform angular interval (about 40 degrees) with respect to the core O of the motor 1.

The distal end of each tooth 4a–4i is connected with the outer core 3. The proximal ends of the teeth 4a–4i are connected together to form a ring 4j. Coils 5a–5i are wound around the associated teeth 4a–4i, respectively. The coils 5a–5i and the associated teeth 4a–4i form nine salient poles 6a–6i for generating a magnetic field. In the first embodiment, the salient poles 6a–6i are divided into three groups, or a first group comprising the salient poles 6a, 6b, 6c, a second group comprising the salient poles 6d, 6e, 6f, and a third group comprising the salient poles 6g, 6h, 6i. Each salient pole group forms an exciter coil.

Figure 2:
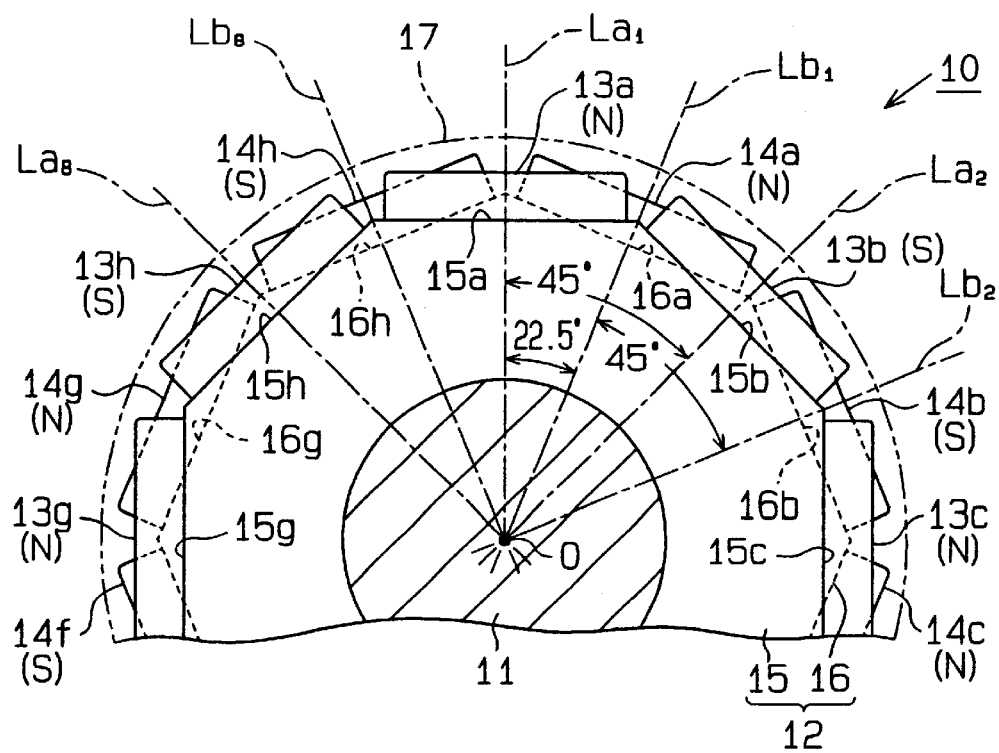
FIG. 2 is a cross-sectional plan view showing a portion of the rotor provided in the motor of FIG. 1.
Figure 3:
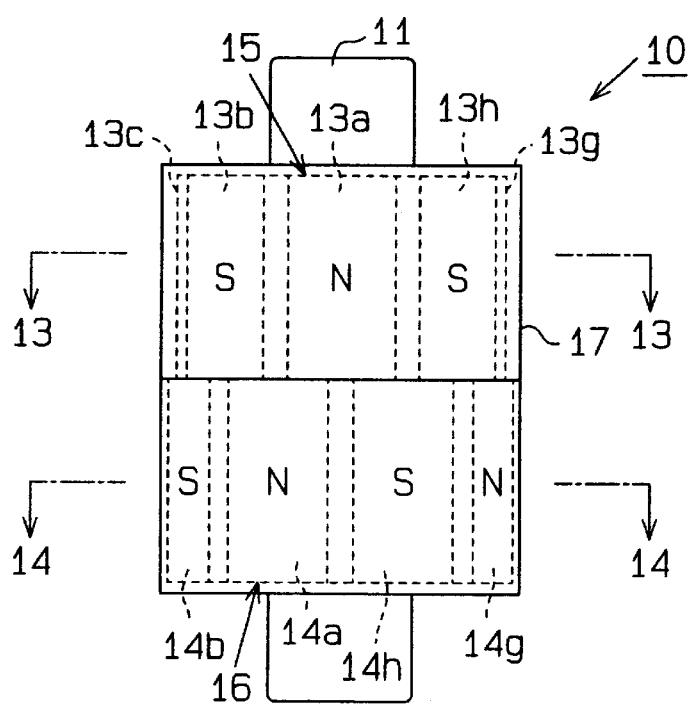
FIG. 3 is a side view showing the locations of the permanent magnets provided in the rotor of FIG. 2.

As shown in FIGS. 1 to 3, the motor 1 includes an eight-pole rotor 10 that has a rotary shaft 11, a base 12, and permanent magnets 13a–13h, 14a–14h. The rotor 10 has a pair of magnet sets each comprising of eight permanent magnets. The permanent magnets 13a–13h form one magnet set, and the permanent magnets 14a–14h form the other. The rotor 10 is rotationally supported by the ring 4j. The revolving magnetic field type motor 1 of the first embodiment is an inner rotor type. The permanent magnets 13a–13h, 14a–14h form eight magnetic poles. The rotary shaft 11 is inserted in the core of the base 12 that is formed of magnetic material.

Figure 4:
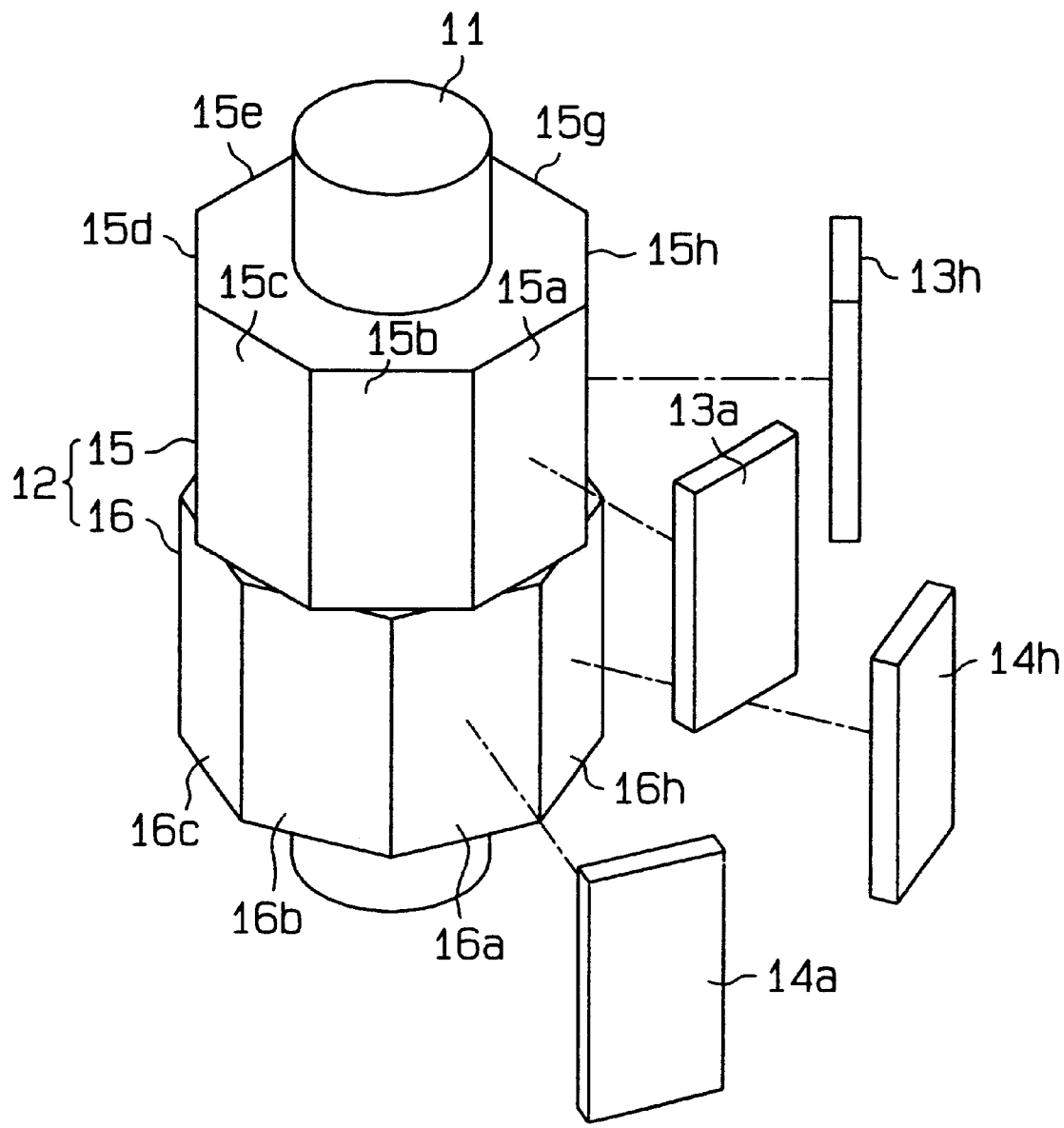
FIG. 4 is a perspective view showing the structure of the rotor of FIG. 2.

As shown in FIG. 4, the base 12 has a first block 15 and a second block 16. The first block 15 forms an upper half of the base 12, and the second block 16 forms a lower half of the base 12, as viewed in the drawing. The cross-section of each block 15, 16 has a regular octagonal shape. The first block 15 and the second block 16 include eight sides 15a–15h, 16a–16h, respectively. The permanent magnets 13a–13h are adhered to the associated sides 15a–15h and the permanent magnets 14a–14h are adhered to the associated sides 16a–16h.

As shown in FIG. 2, eight lines La1–La8 extend from the core O of the motor 1 and intersect the associated sides 15a–15h. The angle between adjacent lines La1–La8 is 45 degrees. In the same manner, eight lines Lb1–Lb8 extend from the core O and intersect the associated sides 16a–16h. The angle between adjacent lines Lb1–Lb8 is 45 degrees. Each permanent magnet 13a–13h is associated with one of the permanent magnets 14a–14h that has the same magnetic pole. The permanent magnet 13a–13h is offset relative to the associated permanent magnet 14a–14h by an offset angle of about 22.5 degrees with respect to the core O. For example, the N-pole permanent magnet 13a is offset relative to the associated N-pole permanent magnet 14a by about 22.5 degrees with respect to the core O.

The lines La1–La8, Lb1–Lb8 each intersect the cross sections of the associated permanent magnets 13a–13h, 14a–14h, as viewed in FIG. 2. The angle between each line La1–La8 and its adjacent line Lb1–Lb8 is substantially 22.5 degrees with respect to the core O.

Figure 5:
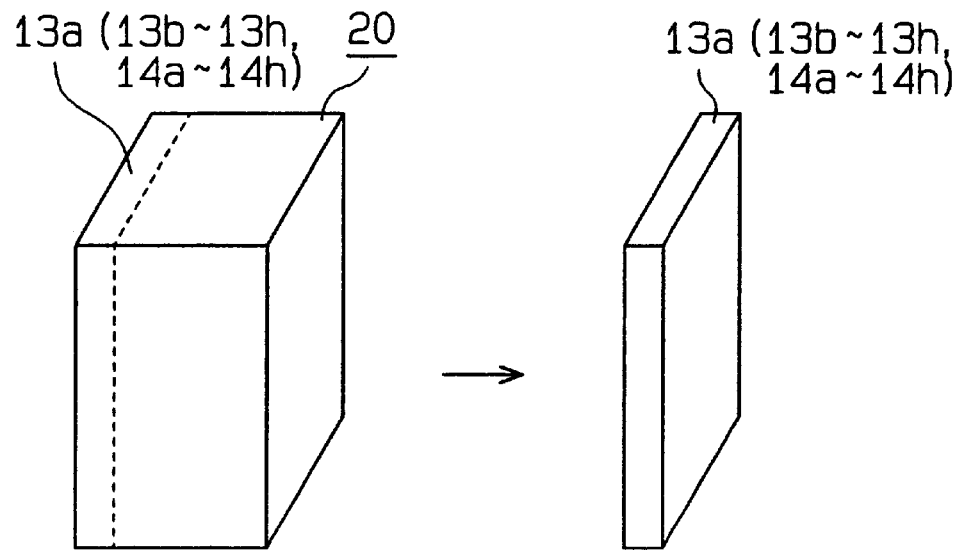
FIG. 5 is a view for explaining a method for manufacturing the permanent magnets of FIG. 1.

Each permanent magnet 13a–13h, 14a–14h is shaped like a parallelepiped. As shown in FIG. 3, the permanent magnets 13a–13h, 14a–14h are located along the associated blocks 15, 16 such that an N pole alternates with an S pole. As shown in FIG. 5, the permanent magnets 13a–13h, 14a–14h are obtained from a permanent magnet block 20 that is shaped like a parallelepiped (or cube) having a predetermined size. Specifically, the permanent magnets 13a–13h are manufactured by cutting the magnet block 20 into pieces having a predetermined size.

As shown in FIGS. 1 and 2, a resin mold 17 encompasses the permanent magnets 13a–13h, 14a–14h. The mold 17 prevents the permanent magnets 13a–13h, 14a–14h from being separated from the base 12 due to centrifugal force or vibration caused by rotation of the motor 1. The mold 17 surrounds the permanent magnets 13a–13h, 14a–14h such that the base 12 including the mold 17 has a pillar shape.

The operation of the revolving magnetic field type motor 1 will now be described.

Figure 7:
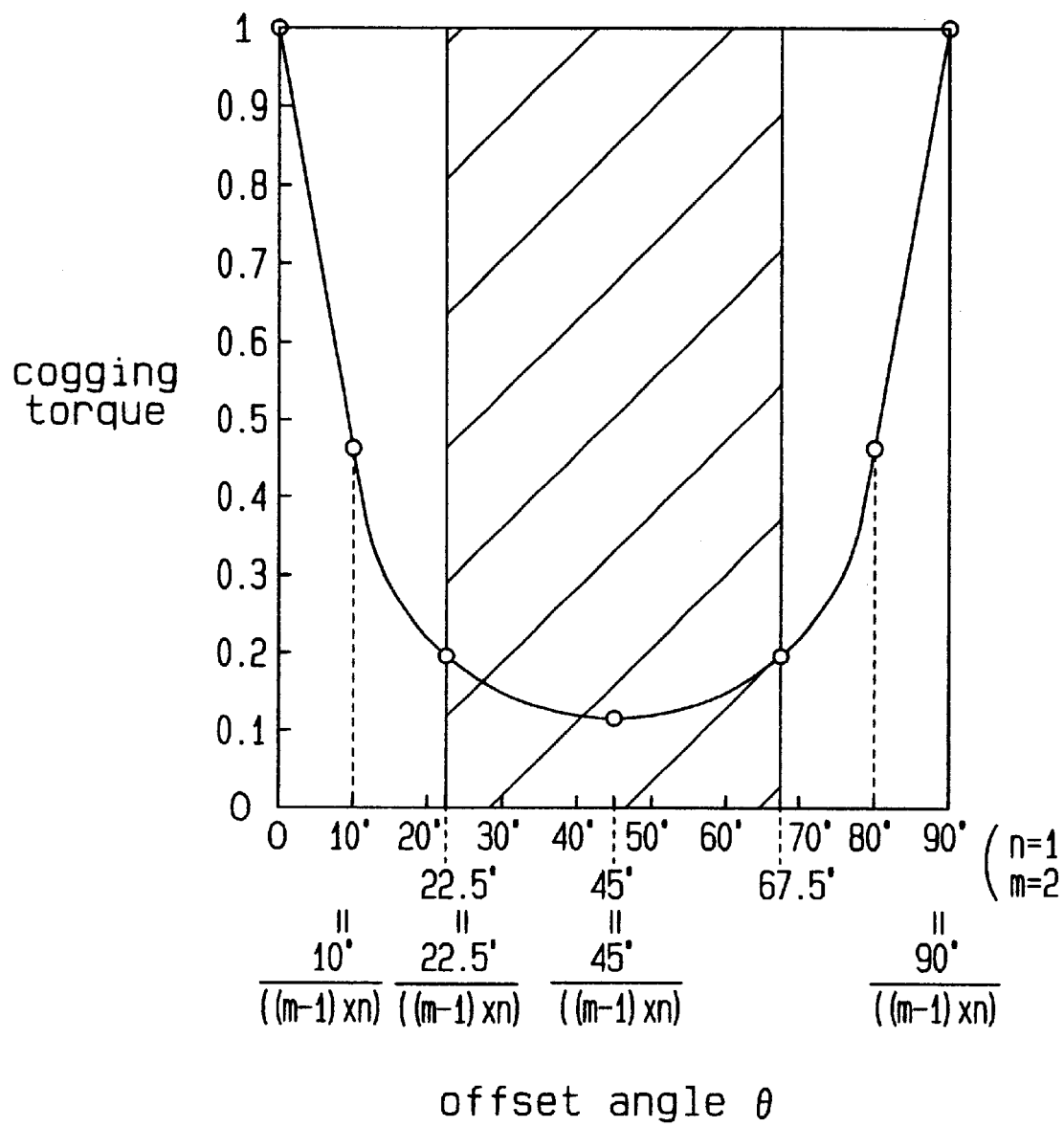
FIG. 7 is a graph showing the relationship between the offset angle and cogging torque.

FIG. 7 is a graph showing the relationship between cogging torque and the offset angle θ between the permanent magnets 13a–13h of the first block 15 and the associated permanent magnets 14a–14h of the second block 16 with respect to the core O. The graph shows cogging torque variation when the offset angle θ varies from zero degrees to ninety degrees. The cogging torque is one when the offset angle θ is zero degrees.

In the motor 1 of the first embodiment, the number of the rotor magnetic poles (P) is eight, and the number of the stator salient poles (T) is nine. The rotor 10 includes two blocks 15, 16, or two magnet sets, which are aligned along the rotational axis of the rotor 10. The graph (FIG. 7) is not restricted to the motor 1 of the first embodiment but is also applicable to motors in which the number of the rotor magnetic poles P is 8n (n is an integer equal to or greater than one), the number of the stator salient poles T is 9n (n is an integer equal to or greater than one), and the number of the magnet sets (blocks) is m (m is an integer equal to or greater than two). In this case, the offset angle θ varies from 0 to 90 degrees/((m−1)×n).

As the offset angle θ increases from zero to about 22.5 degrees, the cogging torque decreases, as shown in FIG. 7. Particularly, a preferred range of the offset angle θ is from about 10 to about 22.5 degrees. The cogging torque corresponding to this range is lower than about 0.5.

As indicated by the hatched portion of FIG. 7, cogging torque remains lower than about 0.2 when the offset angle θ varies from 22.5 degrees to 67.5 degrees. However, in this state, the permanent magnets 13a–13h are located excessively close to opposite poles of the permanent magnets 14a–14h. This significantly reduces the power generated by the motor 1. Thus, it is preferred that the offset angle θ is not in the range from 22.5 degrees to 67.5 degrees, although this range maximally reduces cogging torque.

When the offset angle θ varies from 67.5 degrees to 90 degrees, cogging torque increases in the same manner as when the offset angle θ varies from 22.5 degrees to zero degrees. A detailed description of the cogging torque variation in the range from 67.5 to 90 degrees is thus omitted.

The first embodiment has the following advantages:

Each permanent magnet 13a–13h is associated with one permanent magnet 14a–14h that has the same magnetic pole as the permanent magnet 13a–13h. The permanent magnets 13a–13h are offset relative to the associated permanent magnets 14a–14h by the offset angle θ of 22.5 degrees with respect to the core O. This offset angle θ, 22.5 degrees, is in the preferred offset angle range, as shown in FIG. 7. This maximally reduces cogging torque of the motor 1 while maintaining sufficient power generation by the motor 1. Furthermore, in the first embodiment, the salient poles 6a–6i are divided into three groups as described above, with each group forming an exciter coil. It is thus preferred that the present invention is applied to motors producing a relatively increased cogging torque.

Figure 6:
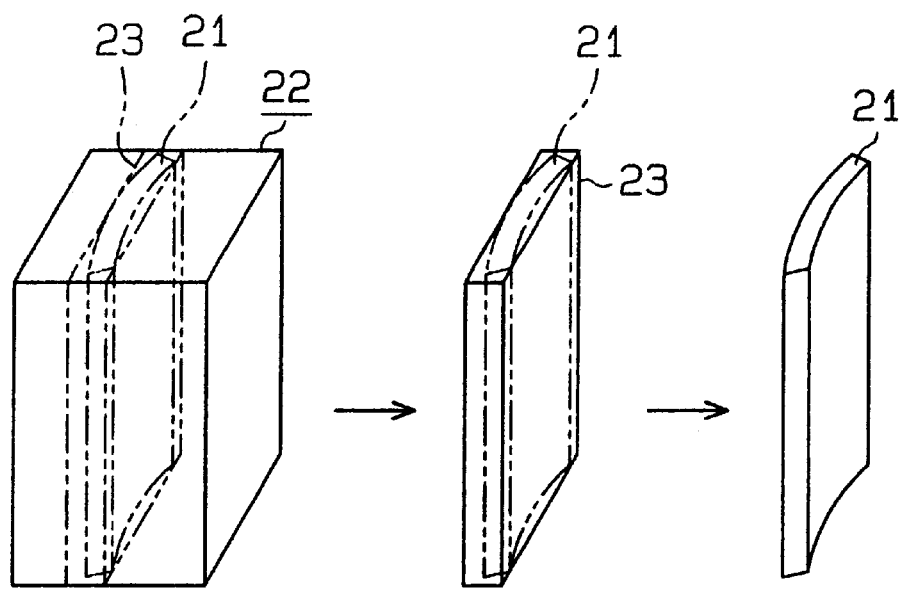
FIG. 6 is a view for explaining a method for manufacturing prior-art arched permanent magnets.

FIG. 6 shows a procedure for manufacturing a prior-art arched permanent magnet 21. Specifically, a parallelepiped-like (or cubic) permanent magnet block 22 that has a predetermined size is cut into a plurality of magnet bodies 23. Each magnet body 23 is shaped like a parallelepiped and has a predetermined size. The magnet body 23 is then machined to an arched shape. In contrast, the permanent magnets 13a–13h, 14a–14h of the first embodiment are substantially flat. The permanent magnets 13a–13h, 14a–14h are thus formed without machining simply by cutting the block 20, as shown in FIG. 5. This simplifies the manufacturing procedure of the permanent magnets 13a–13h, 14a–14h, as compared to that of the arched permanent magnets 21. Furthermore, if the block 20 and the block 22 have the same size, the number of the permanent magnets 13a–13h, 14a–14h obtained from the block 20 is greater than that of the arched permanent magnets 21 obtained from the block 22.

The arched permanent magnets 21 must be adhered to the outer circumference of a pillar base. If the outer circumference of the base does not have the same radius of curvature as the inner side of each arched permanent magnet 21, the outer side of the permanent magnet 21 is pressed by a tool such that the inner side of the permanent magnet 21 adheres to the outer circumference of the base. However, in this case, the permanent magnet 21 may be damaged by the tool or may not be securely adhered to the base. To avoid these problems, the inner side of each permanent magnet 21 must have a radius of curvature corresponding to that of the outer circumference of the base. In the first embodiment, the sides 15a–15h of the first block 15 and the sides 16a–16h of the second block 16 are substantially flat. The surfaces of the permanent magnet 13a–13h, 14a–14h that are attached to the associated sides 15a–15h, 161–16h are also substantially flat. The permanent magnets 13a–13h, 14a–14h are thus easily and reliably affixed to the associated sides 15a–15h, 16a–16h.

The mold 17 encompasses the permanent magnets 13a–13h, 14a–14h. The base 12, together with the mold 17, are as a whole, shaped like a pillar. The mold 17 holds the first block 15 and the second block 16 as one body and prevents the permanent magnets 13a–13h, 14a–14h from separating from the associated blocks 15, 16 due to centrifugal force or vibration caused by rotation of the motor 1. The mold 17 has a relatively increased thickness near the longitudinal middle of each permanent magnet 13a–13h, 14a–14h. The mold 17 thus firmly holds the permanent magnets 13a–13h, 14a–14h, as compared to the case in which the arched permanent magnets 21 are used. Further, the mold 17 has a reduced thickness near the longitudinal sides of each permanent magnet 13a–13h, 14a–14h. The distance between the stator 2 and the longitudinal sides of the permanent magnets 13a–13h, 14a–14h is thus decreased, as compared to the case in which the arched permanent magnets 21 are used. This maximally reduces leakage flux, thus increasing the power produced by the motor 1.

The ring 4j suppresses magnetic field alteration among the teeth 4a–4h. The cogging torque is thus reliably reduced.

The present invention may be modified as follows.

As described above, the present invention is applicable to motors in which the number of the rotor magnetic poles P is Bn (n is an integer equal to or greater than one), the number of the stator salient poles T is 9n (n is an integer equal to or greater than one), and the number of the magnet sets is m (m is an integer equal to or greater than two). Cogging torque is maximally reduced when the offset angle θ is "22.5 degrees/((m−1)×n)". However, as long as the offset angle θ is selected within the prefered range of FIG. 7, which is the range from about 10 degrees/((m−1)×n) to about 22.5 degrees/((m−1)×n), cogging torque is reduced to a value lower than about 0.5.

Figure 8:
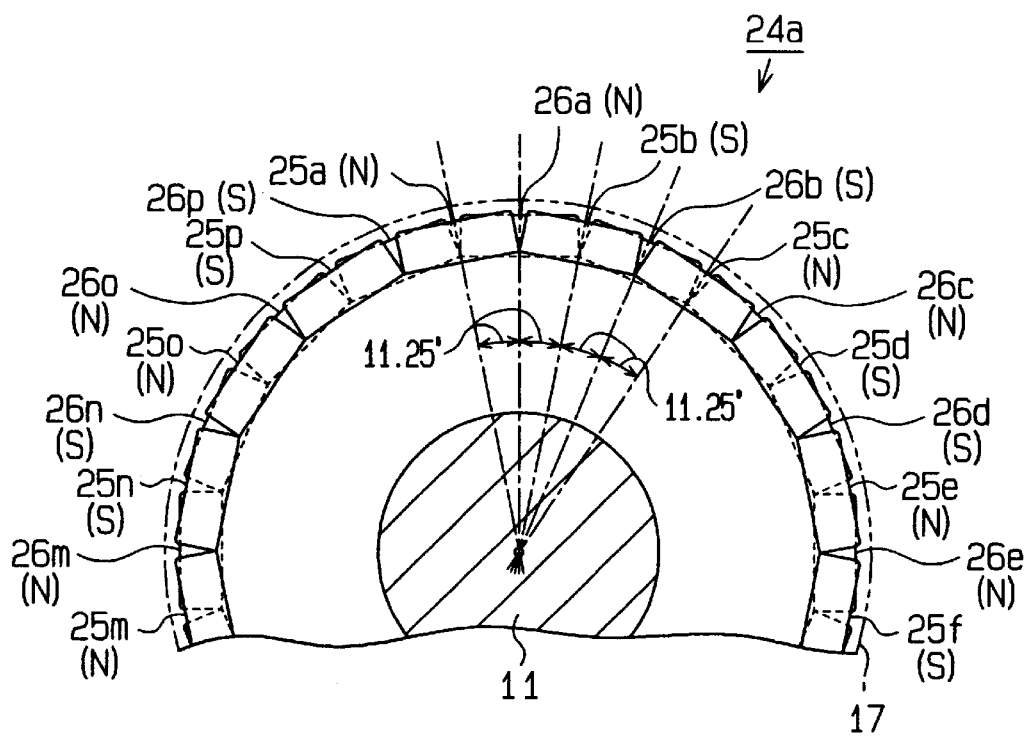
FIG. 8 is a plan view showing a rotor of a second embodiment according to the present invention.

In the above equation, the number "n" may be altered to other numbers. For example, in a second embodiment of the present invention, "n" is two and "m" is two (n=2, m=2). That is, the second embodiment has a sixteen-pole rotor and eighteen salient poles. As shown in FIG. 8, a rotor 24a of the second embodiment has permanent magnets 25a–25p, 26a–26p. The permanent magnets 25a–25p form one magnet set, and the permanent magnets 26a–26p form an other. In order to reduce cogging torque to a value lower than about 0.5, the offset angle e between the permanent magnets 25a–25p and the associated permanent magnets 26a–26p must be selected within the range from about 5 to about 11.25 degrees (using n=2, m=2), as understood from the graph of FIG. 7. When the offset angle θ is about 11.25 degrees, cogging torque is maximally reduced to about 0.2.

Figure 9:
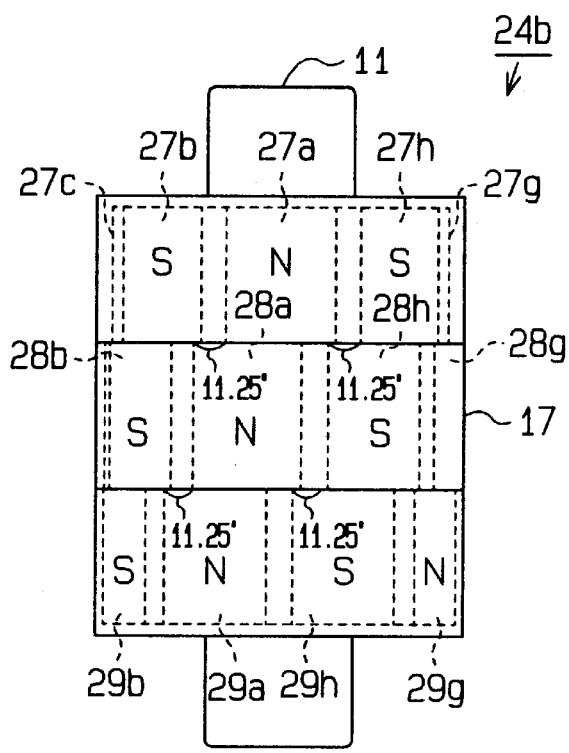
FIG. 9 is a side view showing a rotor of a third embodiment according to the present invention.

Alternatively, the number "m", or the number of the magnet sets, may be altered to other numbers. For example, in a third embodiment of the present invention, "m" is three and "n" is one (n=1, m=3). That is, the fourth embodiment has an eight-pole rotor having three magnet sets and nine salient poles. As shown in FIG. 9, a rotor 24b of the third embodiment has permanent magnets 27a–27h, 28a–28h, 29a–29h. The permanent magnets 27a–27h form a first magnet set, the permanent magnets 28a–28h form a second magnet set, and the permanent magnets 29a–29h form a third magnet set. In order to reduce cogging torque to a preferable value lower than about 0.5, the offset angle θ among the permanent magnets 27a–27h, 28a–28h, 29a–29h is selected from within the range from about 5 to about 11.25 degrees (using n=1, m=3), as understood from the graph of FIG. 7. If the offset angle θ is about 11.25 degrees, cogging torque is maximally reduced to about 0.2.

Figure 10:
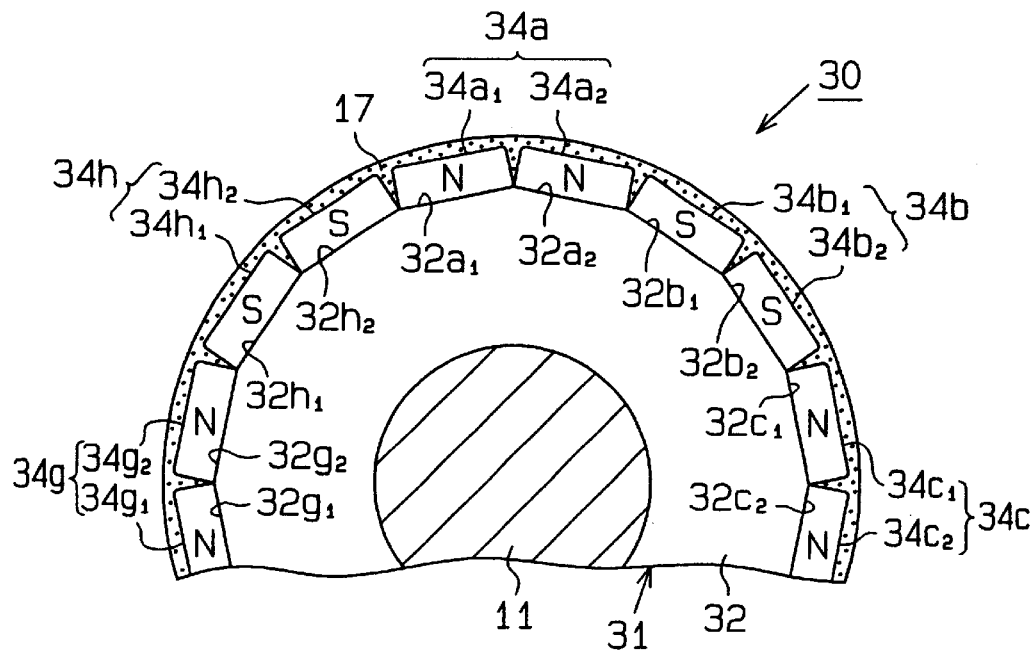
FIG. 10 is a plan view showing a rotor of a fourth embodiment according to the present invention.

In addition, each permanent magnet may be divided into two magnet portions along the longitudinal middle of each permanent magnet. The number of the divided portions per magnet is indicated by the index "k" (k is an integer equal to or larger than two). In a fourth embodiment of the present invention, k is two (k=2). That is, as shown in FIGS. 10 and 11, each permanent magnet of a rotor 30 of the fourth embodiment is divided into two portions.

Figure 11:
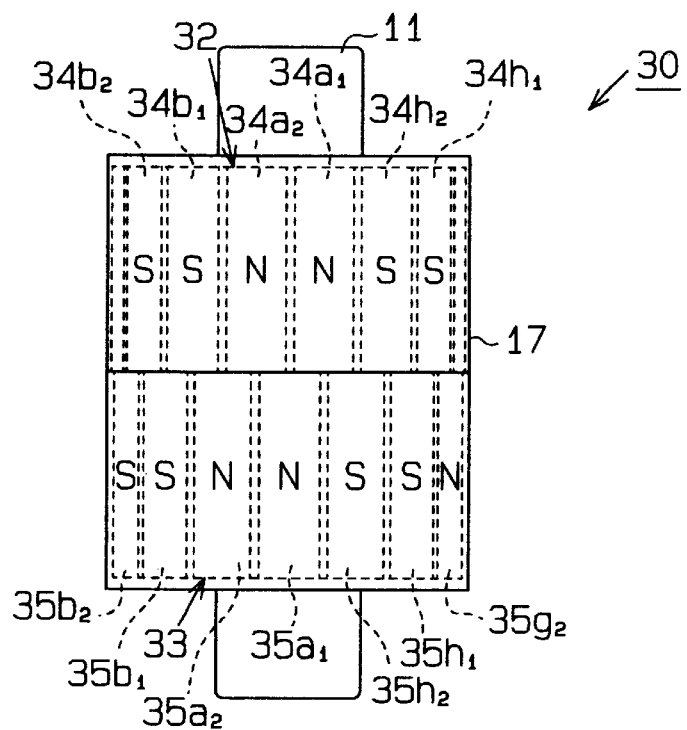
FIG. 11 is a side view showing the rotor of FIG. 10.

As shown in FIG. 11, the rotor 30 has a base 31 and a rotary shaft 11. The base 31 includes a first block 32 and a second block 33 aligned along the axis of the shaft 11. The first block 32 includes eight permanent magnets 34a–34h, and the second block 33 includes eight permanent magnets 35a–35h. The rotor 30 thus has eight magnetic poles. The permanent magnets 34a–34h are each divided into two magnet portions 34a1–34h1, 34a2–34h2. For example, the N-pole permanent magnet 34a is divided into the two N-pole magnet portions 34a1, 34a2. In the same manner, the permanent magnets 35a–35h are each divided into two magnet portions 35a1–35h1, 35a2–35h2. As shown in FIG. 10, the first block 32 has sixteen sides 32a1–32h1, 32a2–32h2. The associated magnet portions 34a1–34h1, 34a2–34h2 are attached to the sides 32a1–32h1, 32a2–32h2. The magnet portions 35a1–35h1, 35a2–35h2 are attached to sixteen sides (not shown) provided in the second block 33. The number of the sides formed in each block 32, 33 is determined as the product of k and P (k×P). The first block 32 is offset relative to the second block 33 by an offset angle θ which is preferably within the range from about zero degrees/((m−1)×n) to about 22.5 degrees/((m−1)×n) with respect to the axis of the shaft 11.

Figure 12:
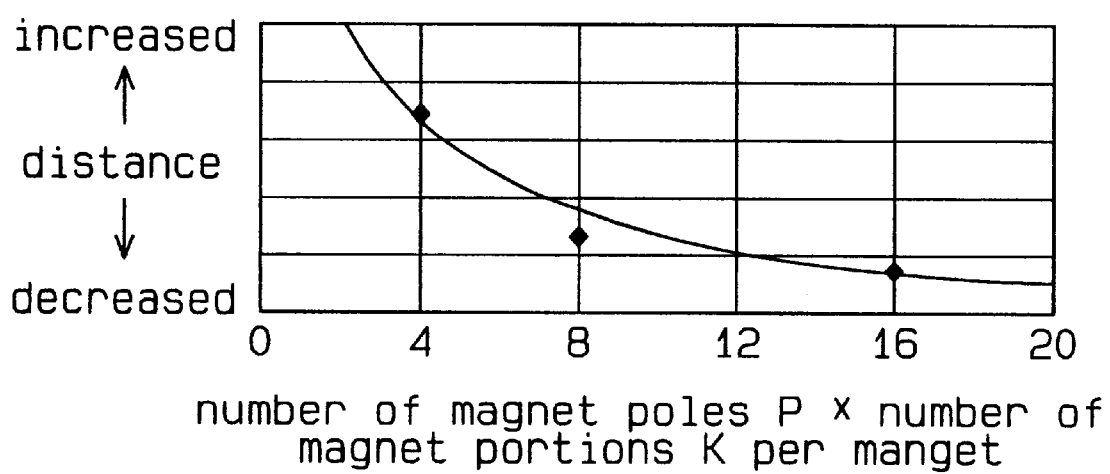
FIG. 12 is a graph showing the relationship between the average distance from each permanent magnet to a ring of a stator and the product of the number of the rotor magnetic poles (P) and the number of the divided magnet portions (k)

As shown in FIG. 12, the structure of the fourth embodiment decreases an average distance between the inner circumference of the ring 4j and each permanent magnet 34a–34h, 35a–35h. This minimizes leakage flux, thus increasing the power generated by the motor 1.

Although the permanent magnets 13a–13h, 14a–14h are substantially flat, the permanent magnets 13a–13h, 14a–14h may be arched, like the arched permanent magnet 21 of FIG. 6.

Instead of forming the permanent magnets 13a–13h, 14a–14h from the block 20, the permanent magnets 13a–13h, 14a–14h may be manufactured by compressing magnetic powder.

Although the mold 17 encompasses the permanent magnets 13a–13h, 14a–14h in the above embodiments, the mold 17 may be omitted as long as the permanent magnets 13a–13h, 14a–14h are firmly secured to the base 12.

Figure 13A:
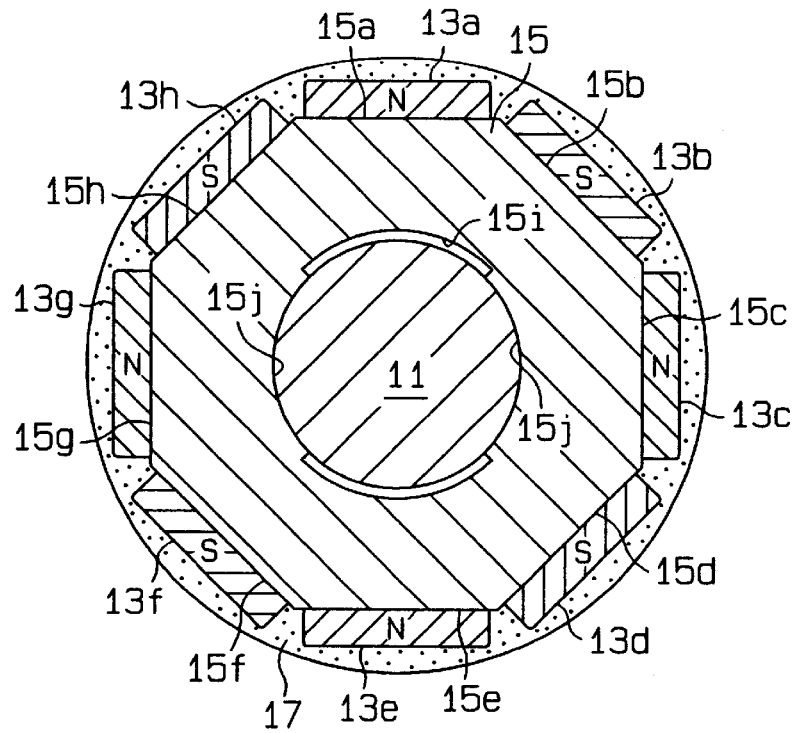
FIGS. 13(A) and 13(B) are a cross-sectional views showing a rotor of a fifth embodiment taken along the lines corresponding to lines A—A and B—B of FIG. 3, respectively.
Figure 13B:
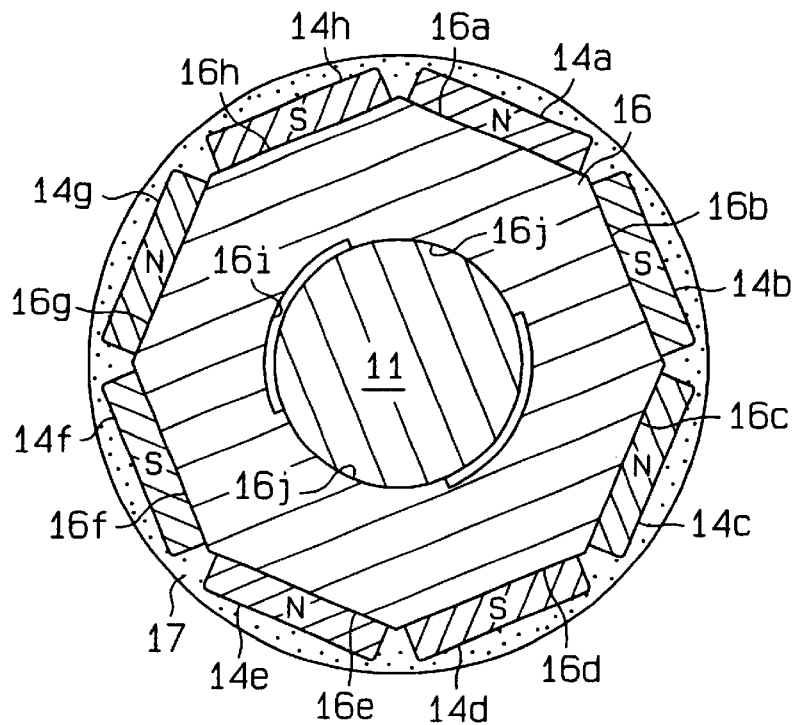

A fifth embodiment of the present invention will now be described with reference to FIGS. 13(A) and 13(B). In this embodiment, an insertion hole 15i extends through the first block 15, and an insertion hole 16i extends through the second block 16. The rotary shaft 11 is inserted through the holes 15i, 16i. The hole 15i has a pair of pressing portions 15j, and the hole 16i has a pair of pressing portions 16j. The diameter of the circle defined by the pressing portions 15j, 16j is slightly smaller than that of the rotary shaft 11. Each pressing portion 15j is offset relative to the associated pressing portion 16j by about 90 degrees with respect to the axis of the rotary shaft 11. The first block 15 is offset relative to the second block 16 by about 22.5 degrees with respect to the axis of the rotary shaft 11. The rotary shaft 11 is inserted from the hole 15i or the hole 16i.

For example, if the rotary shaft 11 is inserted from the hole 15i of the first block 15, each pressing portion 15j slightly deforms or cuts a portion of the rotary shaft 11 abutting the pressing portion 15j. This decreases the diameter of the circle defined by the deformed or cut portions of the rotary shaft 11. However, since the pressing portions 16j are offset relative to the pressing portions 15j, non-deformed portions of the rotary shaft 11 are pressed by the pressing portions 16j. This structure reliably secures the rotary shaft 11 to the first and second blocks 15, 16. The number and the shape of the pressing portions 15j, 16j are not restricted to the above indication.

Figure 14A:
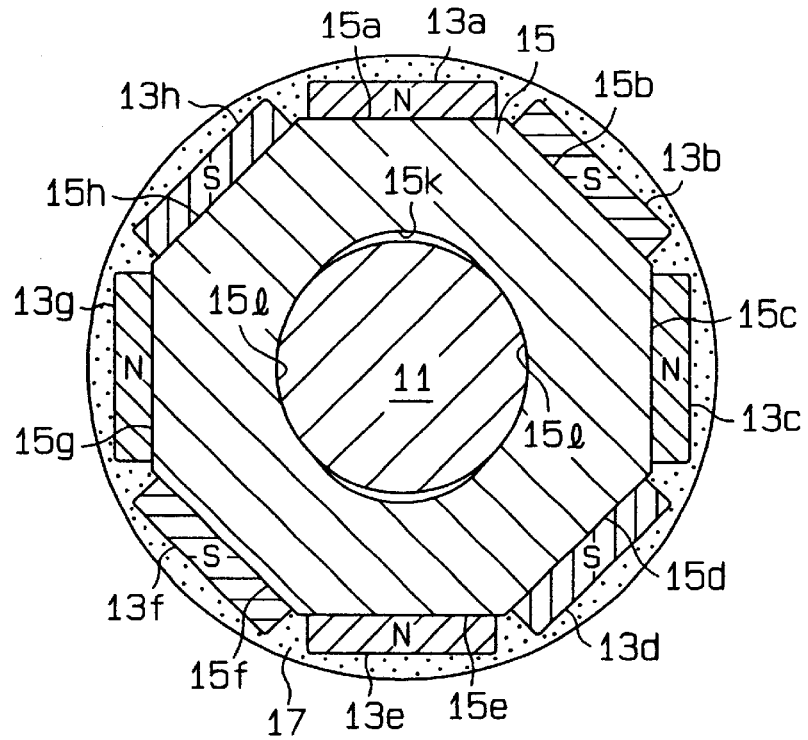
FIGS. 14(A) and 14(B) are a cross-sectional views showing the rotor of a sixth embodiment taken along the lines corresponding to lines A—A and B—B of FIG. 3, respectively.
Figure 14B:
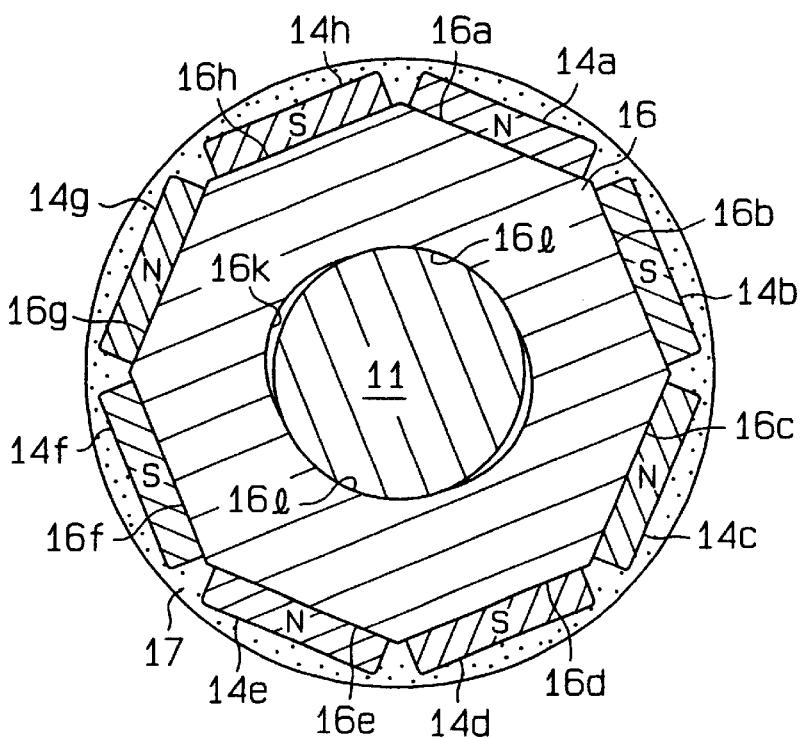

A sixth embodiment of the present invention will hereafter be described with reference to FIGS. 14(A) and 14(B). In this embodiment, an insertion hole 15k extends through the first block 15, and an insertion hole 16k extends through the second block 16. The smallest diameter of each hole 15k, 16k is slightly smaller than the diameter of the rotary shaft 11. A pair of pressing portions 151 are defined along wall portions of the first block 15 corresponding to the smallest diameter of the hole 15k, and a pair of pressing portions 161 are defined along wall portions of the second block 16 corresponding to the smallest diameter of the hole 16k. The first block 15 is offset relative to the second block 16 by about 22.5 degrees with respect to the axis of the rotary shaft 11. Each pressing portion 151 is offset relative to the associated pressing portion 161 by about 90 degrees with respect to the axis of the rotary shaft 11. This structure also reliably secures the rotary shaft 11 to the first and second blocks 15, 16.

Although the revolving magnetic field type motor 1 is an inner rotor type, the present invention may be applied to outer rotor type motors that have a rotor rotating around a stator.

Alternatively, the rotor 10 may include salient poles, and the stator 12 may include permanent magnets.

It should be apparent to those skilled in the art that the present invention may be embodied in many other specific forms without departing from the sprit or scope of the invention. Therefore, the present examples and embodiments are to be considered as illustrative and not restrictive and the invention is not to be limited to the details given herein, but may be modified within the scope and equivalence of the appended claims.

What is claimed is:

1. A revolving magnetic field type motor comprising:
   a rotor having a plurality of sets of permanent magnets, the permanent magnets defining a plurality of rotor magnetic poles, the number of the rotor magnetic poles being "P", the rotor having plurality of blocks aligned in the rotor's axial direction, the number of the blocks being "m", each block having a set of the rotor magnetic poles, one set of the permanent magnets being offset relative to an adjacent set of the permanent magnets by a predetermined offset angle in the rotor's rotation direction; and
   a stator having a plurality of coils, the coils defining a plurality of stator magnetic poles around an axis of the stator, the number of the stator magnetic poles being "T", the coils generating a magnetic field for rotating the rotor when supplied with an electric current;
   wherein the predetermined offset angle is within a range from about zero degrees to about 22.5 degrees/((m−1)×n), wherein the number of the rotor magnetic poles "P" is 8n (n is an integer equal to or greater than one), the number of the stator magnetic poles "T" is 9n (n is an integer equal to or greater than one), and the number of the blocks "m" is an integer equal to or greater than two.

2. The motor as set forth in claim 1, wherein the offset angle is selected within a range from about 10 degrees/((m−1)×n) to about 22.5 degrees/((m−1)×n).

3. The motor as set forth in claim 1, wherein the offset angle is about 22.5 degrees/((m−1)×n).

4. The motor as set forth in claim 1, wherein the permanent magnets are located in a resin molding.

5. The motor as set forth in claim 1, wherein each block has a hole through which a rotary shaft is inserted, each hole including a support wall portion for holding the rotary shaft, the wall portion of one block being offset relative to the wall portion of the adjacent block in the rotor's rotational axis.

6. The motor as set forth in claim 1, wherein each stator includes a plurality of cores around which the coils are wound, adjacent cores being connected with each other such that all of the cores together form a ring.

7. The motor as set forth in claim 1, wherein each block is shaped like a regular polygonal prism including a plurality of sides, the number of the sides corresponding to a product of the number of the rotor magnetic poles "P" and an integer.

8. The motor as set forth in claim 7, wherein each permanent magnet is secured to one side of an associated block.

9. The motor as set forth in claim 8, wherein each permanent magnet has a rectangular cross-sectional shape.

10. The motor as set forth in claim 8, wherein each rotor magnetic pole is defined by one permanent magnet.

11. The motor as set forth in claim 8, wherein each rotor magnetic pole of the associated block is defined by a plurality of the permanent magnets.

12. A revolving magnetic field type motor comprising:
   a rotor having a plurality of permanent magnets, the permanent magnets defining a plurality of rotor magnetic poles, the number of the rotor magnetic poles being "P", the rotor having a plurality of blocks aligned in the rotor's axial direction, the number of the blocks being "m", each block being shaped like a regular polygonal prism having sides the number of which corresponds to a product of the number of the rotor magnetic poles "P" and an integer, each permanent magnet being secured to one side of an associated one of the blocks, the permanent magnets of one block being located offset relative to the permanent magnets of an adjacent block by a predetermined offset angle in the rotor's rotational direction; and a stator having a plurality of coils and extending around the rotor, the coils defining a plurality of stator magnetic poles around the axis of the stator, the number of the stator magnetic poles being "T", the coils generating a magnetic field for rotating the rotor when supplied with an electric current;

the offset angle being within a range from about 10 degrees/((m−1)×n) to about 22.5 degrees/((m−1)×n), wherein the number of the rotor magnetic poles "P" is 8n (n is an integer equal to or greater than one), the number of the stator magnetic poles "T" is 9n (n is an integer equal to or greater than one), and the number of the blocks "m" is an integer equal to or greater than two.

13. The motor as set forth in claim 12, wherein each permanent magnet is secured to one side of the associated block.

14. The motor as set forth in claim 12, wherein each permanent magnet has a rectangular cross-sectional shape.

15. The motor as set forth in claim 12, wherein each rotor magnetic pole of the associated block is defined by one permanent magnet.

16. The motor as set forth in claim 12, wherein each rotor magnetic pole of the associated block is defined by a plurality of permanent magnets.

17. The motor as set forth in claim 12, wherein the permanent magnets are located in a resin molding.

18. The motor as set forth in claim 12, wherein each block has a hole through which a rotary shaft is inserted, each hole including a support wall portion for holding the rotary shaft, the wall portion of one block being offset relative to the wall portion of the adjacent block in the rotor's rotational axis.

19. The motor as set forth in claim 12, wherein each stator includes a plurality of cores around which the coils are wound, adjacent cores being connected with each other such that all of the cores together form a ring.

* * * * *

UNITED STATES PATENT AND TRADEMARK OFFICE
CERTIFICATE OF CORRECTION

PATENT NO. : 6,252,323 B1  Page 1 of 1
DATED : June 26, 2001
INVENTOR(S) : Nishikawa et al.

It is certified that error appears in the above-identified patent and that said Letters Patent is hereby corrected as shown below:

Title page,
Item [30] Foreign Application Priority Date, third entry should read:
Feb. 29, 2000 (JP).....12-054707

Signed and Sealed this

Twenty-seventh Day of November, 2001

*Attest:*

*Nicholas P. Godici*

*Attesting Officer*

NICHOLAS P. GODICI
*Acting Director of the United States Patent and Trademark Office*